United States Patent [19]

Senshu

[11] Patent Number: 4,912,695

[45] Date of Patent: Mar. 27, 1990

[54] METHOD FOR RECORDING INFORMATION INCLUDING ERROR INFORMATION ON A DISK

[75] Inventor: Susumu Senshu, Saitama, Japan

[73] Assignee: Pioneer Electronic Corporation, Tokyo, Japan

[21] Appl. No.: 177,733

[22] Filed: Apr. 5, 1988

[30] Foreign Application Priority Data

Apr. 8, 1987 [JP] Japan ................... 62-86430

[51] Int. Cl.$^4$ .................. G11B 5/76; G06F 11/10
[52] U.S. Cl. ...................... 371/40.4; 369/59
[58] Field of Search .......... 369/59, 54, 58; 360/48, 360/49, 53, 63, 39, 31, 32; 371/39, 40

[56] References Cited

U.S. PATENT DOCUMENTS 4,698,810 10/1987 Fukuda et al. ................. 369/59
4,706,250 11/1987 Patel ........................ 371/39

FOREIGN PATENT DOCUMENTS 56-133619 3/1983 Japan ........................ 369/58

OTHER PUBLICATIONS

Magnetic Peripherals, Inc., Preliminary Product Specification for 97704, Intelligent Hydra Drive, Doc. No. 64401500, Rev. 1, 3/86.
Monforte, John, "The Digital Reproduction of Sound", Scientific American, Dec. 1984, p. 78–84.

Primary Examiner—Vincent P. Canney
Attorney, Agent, or Firm—Sughrue, Mion, Zinn, Macpeak & Seas

[57] ABSTRACT

In recording a data disk, the disk is divided into n+m sectors defining a group. Data and corresponding error correction codes are written into each of n sectors. The remaining m sectors are written with error correction code spanning the n sectors including the previously written error correction code.

3 Claims, 4 Drawing Sheets

FIG. 4

METHOD FOR RECORDING INFORMATION INCLUDING ERROR INFORMATION ON A DISK

DESCRIPTION

1. Field Of The Invention

The present invention relates to a disk recording method suitable for use with an optical disk. In the present invention, (n+m) sectors are defined as one group, and when data and an error correction code are written in each of the n sectors, an error correction of a group to which the n sectors belong is written in the remaining m.

2. Background Art

FIG. 6 shows timing charts for a prior art optical disk recorder and player. An optical disk is divided into a plurality of sectors and one group is made up of a number n (four in the figure) of data sectors $S_1$–$S_4$ and a number m (two in the figure) of replacement sectors (trace (a) of FIG. 6). Note that one group does not necessarily correspond to one revolution of the disk. When data are sequentially written in the n data sectors (trace (b) of FIG. 6), the respective sectors are immediately read for a verification read (trace (c) of FIG. 6). Provided that the number of errors is less than a predetermined limit value, writing of data for the following group is performed. If the number of errors exceeds the limit value when the data are written in the data sectors (trace (d) of FIG. 6) and are verify read, the data contained in that sector with an error are rewritten in any one of the replacement sectors (trace (e) of FIG. 6). The replacement sectors are immediately subjected to verify read (trace (f) of FIG. 6), and when the number of errors is less that a limit value, writing of data in the following group is executed.

As described in the prior art apparatus, depending upon the results of the verify read, data are again written into a previously prepared replacement sector. Accordingly, it has been difficult to continuously write data in the groups in succession even if memories are provided for all (n+m) sectors (i.e., one group), since extra time is needed for performing the verify read.

SUMMARY OF THE INVENTION

In view of the foregoing, an object of the present invention is to eliminate the verify read, thereby allowing the continuous writing of data in the groups in close succession.

The invention provides a disk recording method comprising the steps of: dividing a disk into a plurality of sectors wherein a number (n+m) of sectors are defined as one group; producing a sector error correction code for each of data sectors from data to be recorded in each of the n sectors; further producing a group error correction code of the group to which the n sectors belong both from the data to be recorded in the respective n sectors and from the error correction codes of the respective sectors; sequentially writing the data and the sector error correction code in the respective n sectors; and sequentially writing the group error correction code in m sectors following the n sectors.

BRIEF DESCRIPTION OF THE DRAWINGS

FIG. 4 is an explanatory diagram of a format according to the apparatus in FIG. 1.

DETAILED DESCRIPTION OF THE PREFERRED EMBODIMENT

A disk is divided into a plurality of sectors, and one group is made up of a number (n+m) of sectors. An error correction code of a sector is produced from data to be recorded in that sector. The data and the sector error correction code of the sector are successively written in each of the n sectors. A group error correction data of the group is produced from data to be written in the n sectors and from the sector error correction codes. The error correction code of the group thus produced is sequentially written in the sectors following the n sectors after writing of data in the n sectors is ended.

Figure 1:
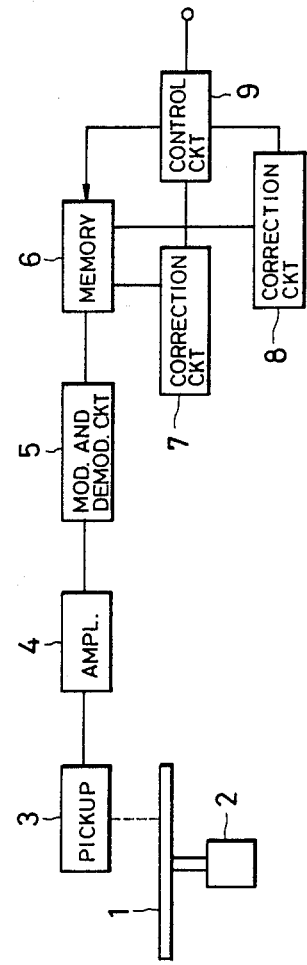
FIG. 1 is a block diagram showing an optical disk apparatus according to the present invention.

FIG. 1 is a block diagram showing an optical disk recording and playback apparatus to which the disk recording method according to the invention is applied. Recording data (trace (a) of FIG. 2) inputted from a host computer (not shown) is applied through a control circuit 9 to a memory 6 in which the input data are momentarily stored (trace (b) of FIG. 2). A first correction circuit 7 produces a sector error correction code (parity) for each of the respective sectors from data inputted the first correction circuit and stores the sector error correction codes at proper places in the memory (trace (c) of FIG. 2). A second correction circuit 8 sequentially produces a group error correction code (parity) for the group of the data stored in the memory 6 and the error correction code produced and attached to the group in the memory 6 by the first error correction circuit 7 (trace (d) of FIG. 2). Although the group error correction code cannot be produced unless all the data of the n sectors and the sector error correction codes of the respective sectors are present, the arithmetic operations are sequentially performed with respect to the data having been inputted to both the first and second arithmetic circuits 7 and 8, thereby allowing the quick production of the group error correction code based upon the sector error correction code of the final sector being produced.

Figure 2:
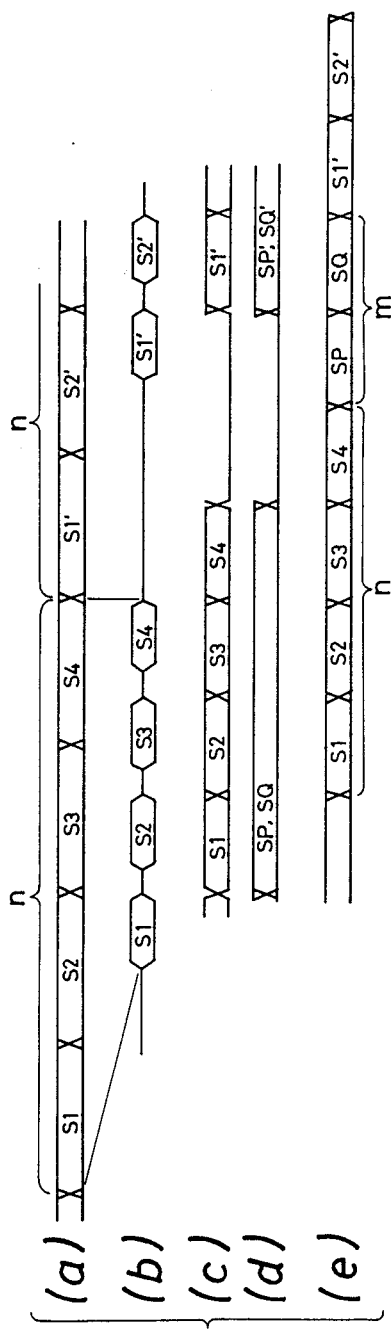
FIGS. 2A through E and 3A through E and are timing charts of the apparatus in FIG. 1.

The n sector data and the associated sector error correction codes, and the group error correction code for the m sectors are sequentially read out of the memory 6 (trace (e) of FIG. 2) and are applied to a modulation/demodulation circuit 5 where the input is modulated (e.g., $M^2$ modulation). The modulation output is applied to a pickup 3 after being amplified by an amplifier circuit 4 and is written in the associated sector of the optical disk 1.

Figure 4:
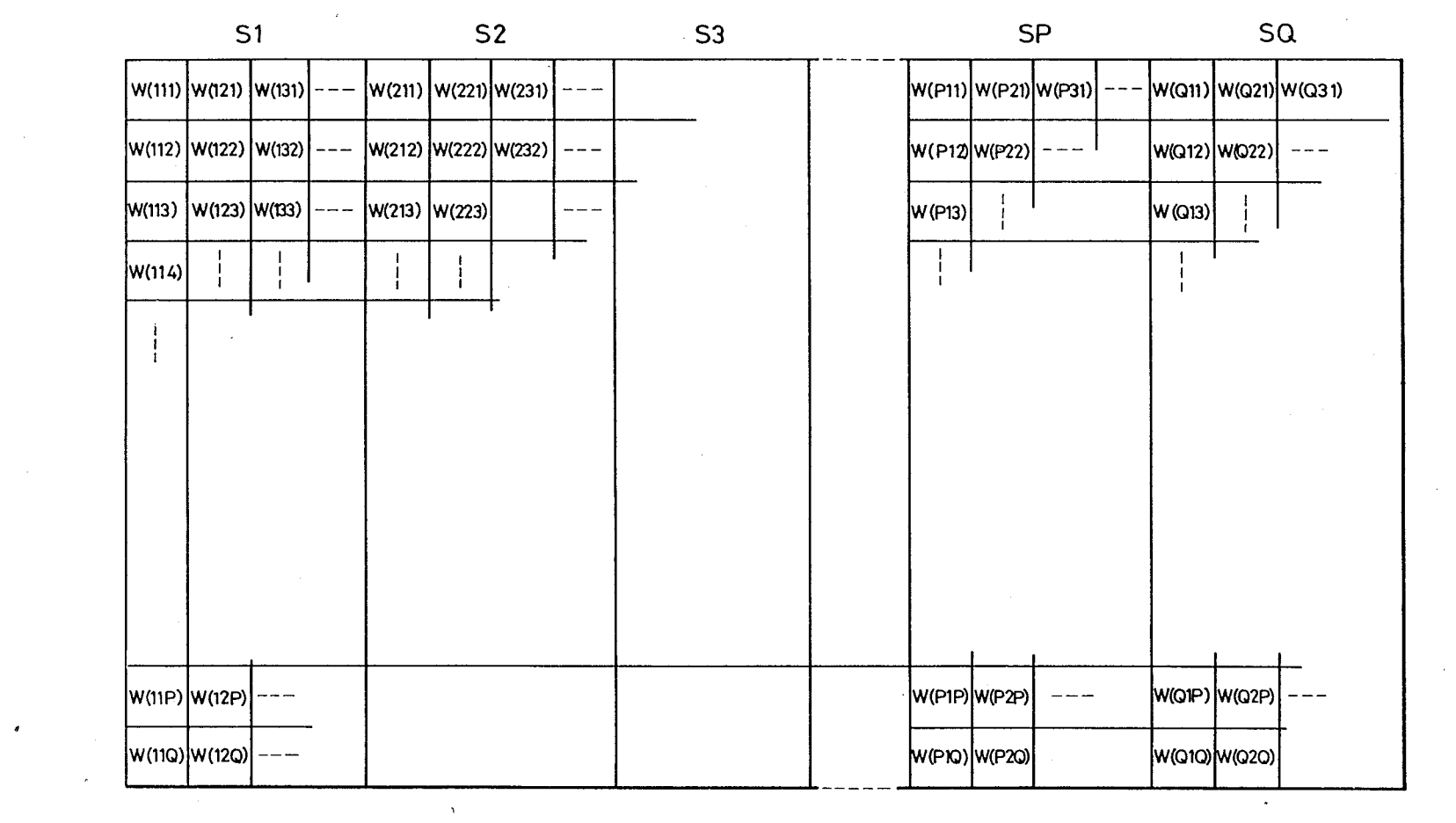

FIG. 4 represents a format of each of the sectors. The sector error correction code appears in the vertical direction in the figure. From words W(111), W(112), W(113) . . . in the first sector $S_1$, sector error correction words W(11P) and W(11Q) of the sector error correction code are produced. The group error correction code appears in the horizontal direction in the figure. Group error correction words W(P11) and W(Q11) of the group error correction code are produced from the word W(111) of the first sector $S_1$, word (211) of the second sector $S_2$, word W(311) of the third sector $S_3$ . . . . The sector error correction and the group error correction code are generally produced by a wellknown technique such as Reed Solomon Code Method, B-adjacent Code Method where B is integer more than one, or the like, and further may be formed by the same coding.

Figure 5:
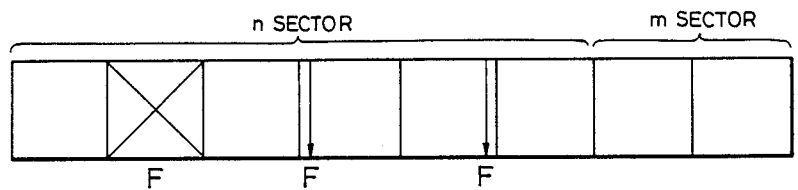
FIG. 5 is an explanatory diagram of a sector.
Figure 6:
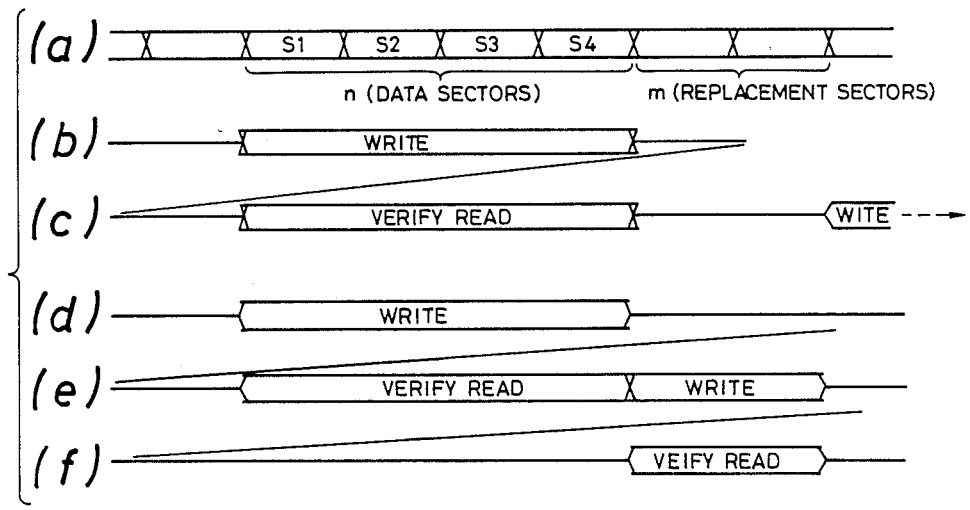
FIG. 6A through F shows timing charts of a conventional optical disk apparatus.

Prior to the writing operation, a sector address ID for confirming a recording sector is read out from the disk. Conventionally, when a certain sector, for example, the second sector in FIG. 5, is unreadable, the data corresponding to the unreadable sector is written in a replacement sector. In the present invention, on the other hand, the data corresponding to the unreadable sector is neither written in its home sector (since the data is unreadable even if the data were written therein) nor written in a replacement sector (since no separate replacement sector is provided). The writing operation is continued with respect to the second sector with the same timing as it would have been done if the first sector had been fault free.

Upon termination of the writing of one group (which, as described before, may not necessarily be made up of the number of sector corresponding to one revolution of the disk), the writing of the next group is sequentially executed. The verify read immediately after the respective sectors are written, as is done in the prior art, is not implemented in the invention.

However, in the invention, in the case where the optical player is incapable of reading a number of sector addresses which are more than a number of sectors correctable by the group correction code, data are instead written in a replacement track. In this case, although the continuity of writing is not attained, no problem is involved from the practical point of view, since such does not occur very often.

Figure 3:
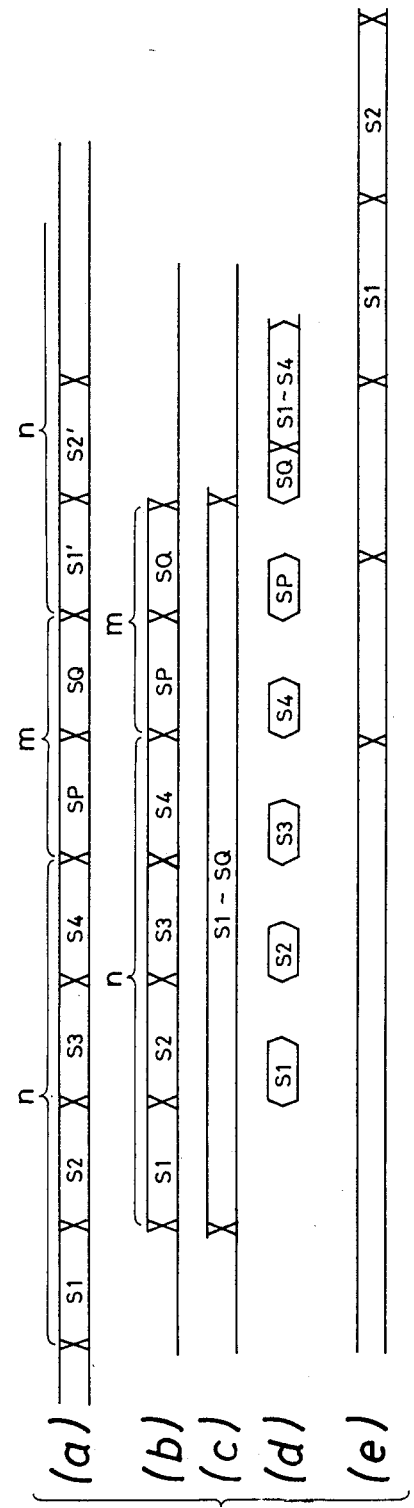

For reading, the data (trace (a) of FIG. 3) written on the optical disk 1 is picked up by the pickup 3 and is demodulated by the modulation/demodulation circuit 5 after being amplified by the amplifying circuit 4. The demodulated output is stored in the memory 6 (trace (b) of FIG. 3). The first correction circuit 7 produces an error signal for the vertically illustrated units of each of the respective sectors from the data stored in the memory 6. The second correction circuit 8 produces a signal for the horizontally illustrated units of the group from the data stored in the memory 6 (trace (c) of FIG. 3). If an error is determined to be present in the data of the respective sectors, error correction is performed on the vertically arranged data within the sector. If the sector error correction is disabled by an excessive number of sector errors, a loss flag is imposed on the data of the correcting vertical line of sector data being corrected. In the group, an erasure correction is performed on the horizontally arranged data when the loss is activated (trace (d) of FIG. 3). The corrected data is sent via the control circuit 9 to the host computer (trace (e) of FIG. 3).

Despite the fact that no data is present in the second sector because of an unreadable sector address, as indicated in FIG. 5, correction (reconstruction) can be carried out based upon the group error correction code. Even though the overall data of one sector is not present, correction, can be performed since the group error correction code indicates that only one word is missing (the second sector of FIG. 5). Specifically, while in the prior art the length of interleaving is limited to one sector, the length of the interleaving in the present invention is lengthened to (n+m) sectors, whereby burst errors can be coped with to a large extent.

In the case that not only the second sector is disabled but also the x-th line of the fourth sector and the y-th line of the fifth sector are uncorrectable, as shown in FIG. 5, the data of three sectors are incapable of being reproduced according to the prior art method. In the method of the present invention, on the other hand, the uncorrectable lines in the fourth and fifth sectors are different, hence only two lines are judged to be in error during any one operation of the group correction code. Accordingly, all the data of those three sectors can be corrected (reconstructed) provided that the group correction code has a maximum correcting capability of at least two lines.

In the present invention, since cross-interleaving codes (product codes) are established in the sector and in the group, it is possible to enhance the correction efficiency by first carrying out the correction operation in the vertical direction and then carrying out a second correcting operation in the horizontal direction.

As described, the disk recording method of the invention is performed in such a manner that a disk is divided into a plurality of sectors wherein (n+m) sectors are defined as one group. A sector error correction code of each of the n sectors is produced from data to be recorded in each of the n sectors. A group error correction code of the group to which the n sectors belong is further produced both from data to be recorded in the respective n sectors and from the sector error correction codes of the respective sectors. The data and the sector error correction codes of the sector are sequentially written in the respective n sectors. The group error correction code of the group is sequentially written in m sectors following the sectors. Thereby, the error correction capability can be enhanced and the verify read can be eliminated which is otherwise needed at the time of writing in the prior art. Accordingly, the data for the respective groups can be successively written in the disk.

What is claimed is:
1. A disk recording method, comprising:
dividing a recording disk into a plurality of sectors where (n+m) sectors are defined as belonging to one group;
producing an error correction code of each of n of said (n+m) sectors from data to be recorded in each of said n sectors;
producing an error correction code of a group to which said n sectors belong from data to be recorded in the respective n sectors and from said error correction codes of the respective n sectors;
sequentially writing on said disk said data and said error correction codes of the sectors in the respective n sectors; and
sequentially writing on said disk said error correction code of said group in m of said (n+m) sectors following said n sectors.
2. A disk recording method as recited in claim 1, wherein said error correction codes of said sectors and of said groups are parity codes.
3. A disk recording method as recited in claim 1, wherein said sectors are divided into lines of multiple words;
wherein said step of producing said error correction code of said n sectors comprises producing a plurality of error correction words for said multiple words for each of said lines; and
wherein said step of producing said error correction code of said group comprises producing a plurality of error correction words from a combination of corresponding ones of said multiple words in corresponding ones of said lines of said n sectors.

* * * * *